United States Patent
Houliang et al.

(10) Patent No.: US 6,732,429 B2
(45) Date of Patent: May 11, 2004

(54) METHOD FOR MEASURING PRESSURE ON THE SUBSTRATE OF SPIN FORMED CATALYTIC CONVERTER

(75) Inventors: Li Houliang, Novi, MI (US); Vincent Carrara, South Boston, MA (US); Earl Nelson, Livonia, MI (US); Doug Seifert, Toledo, OH (US); Joseph Lanzesira, Monroe, OH (US); Paul Plenzler, Sylvania, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 159 days.

(21) Appl. No.: 10/007,467

(22) Filed: Dec. 3, 2001

(65) Prior Publication Data

US 2002/0104214 A1 Aug. 8, 2002

Related U.S. Application Data

(60) Provisional application No. 60/251,490, filed on Dec. 5, 2000.

(51) Int. Cl.[7] .............................................. H05K 13/00
(52) U.S. Cl. ....................... 29/854; 29/407.08; 29/520; 29/593; 29/890; 72/19.9; 72/85; 310/232
(58) Field of Search .................. 29/854, 595, 593, 29/825, 729, 745, 757, 407.08, 506, 508, 520, 714, 890, 890.08, 890.036, 890.037, 890.62; 72/19.8, 19.9, 81, 84, 85; 310/232

(56) References Cited

U.S. PATENT DOCUMENTS

| 4,969,246 A | * | 11/1990 | Dryer ..................... 29/402.06 |
| 5,231,374 A | * | 7/1993 | Larsen et al. ............... 340/540 |
| 5,953,817 A | * | 9/1999 | Watanabe et al. ............. 29/890 |
| 6,381,843 B1 | * | 5/2002 | Irie et al. ...................... 29/890 |
| 6,521,193 B1 | * | 2/2003 | Hijikata et al. ............. 422/179 |

FOREIGN PATENT DOCUMENTS

| EP | 1 074 704 A2 | 7/2001 |
| JP | 2000 179334 A | 6/2000 |

* cited by examiner

*Primary Examiner*—Peter Vo
*Assistant Examiner*—Donghai Nguyen
(74) *Attorney, Agent, or Firm*—Brinks Hofer Gilson & Lione

(57) ABSTRACT

The present invention is generally directed towards a catalytic converter installed in the motor vehicles. More specifically to a method of measuring the pressure on the substrate as the catalytic converter is subject to the spin forming process. A pressure-measuring device such as a sensor is contact with the substrate. In order to transfer data from the rotating catalytic converter to a stationary object, a slip ring device is connected to the pressure-measuring sensor.

17 Claims, 2 Drawing Sheets

METHOD FOR MEASURING PRESSURE ON THE SUBSTRATE OF SPIN FORMED CATALYTIC CONVERTER

PRIORITY CLAIM

This application claims priority to U.S. Provisional Application, Serial No. 60/251,490 filed Dec. 05, 2000.

TECHNICAL FIELD OF THE INVENTION

This invention relates to a catalytic converter installed in a motor vehicle. More specifically, this invention relates to a method and apparatus for measuring pressure on a substrate of a catalytic converter.

BACKGROUND OF THE INVENTION

Automotive vehicles use catalytic converters to reduce emissions. Catalytic converters occupy various position in the vehicles, some of which require the exhaust inlet and the outlet tubes to be positioned in specific angles with respect to the catalytic convertor body.

One of the preferred way of assembling a catalytic converter is to form the external shell out of a single piece of steel tube. By varying the diameter of the of the tube from narrow to wide and then narrow, a converter body is formed.

One of the techniques known to form catalytic converters is a spinform techniques. During the spin forming method the catalytic substrate present in the catalytic converter is subject to high pressure that can result in the breakage of the substrate. Therefore, there is a need to measure the pressure on the substrate as the catalytic converter is subject to the spin forming process.

SUMMARY OF THE INVENTION

In accordance with the teachings of the present invention a method and apparatus of measuring pressure on the substrate during the spin forming process. Preferably, a pressure-measuring device is in contact with the substrate. The pressure-measuring device is connected to a slip ring device comprising a rotating part and a stationary part. In accordance with the teachings of the preferred embodiment of the present invention, the stationary part of the slip ring device is connected to a controlling device such that the pressure is measured on the controlling device.

BRIEF DESCRIPTION OF THE DRAWINGS

Further features of the invention will become apparent from the following discussion and the accompanying drawings in which.

DETAILED DESCRIPTION OF THE PREFERRED EMBODIMENT

Figure 1:
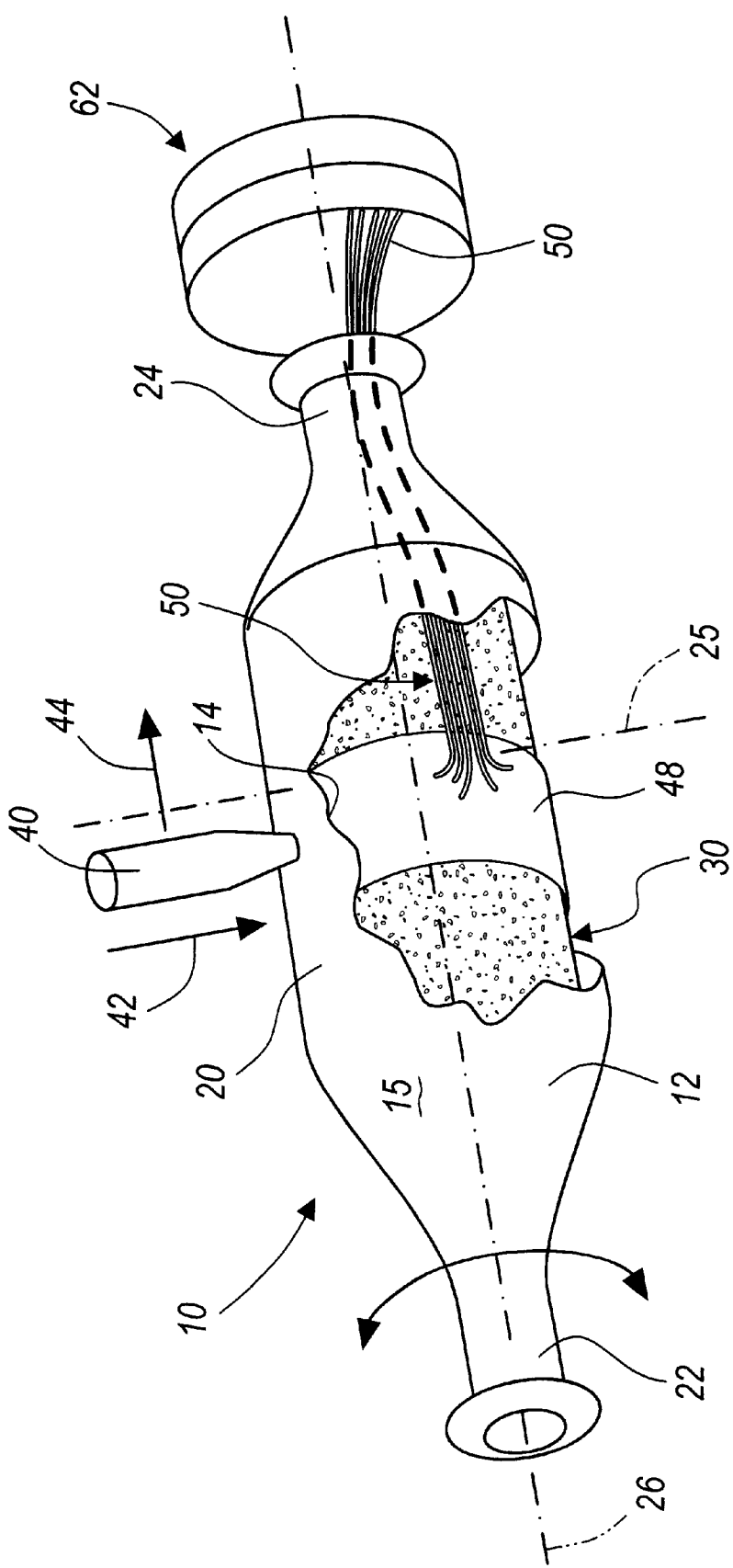
FIG. 1 is a cut out view of the catalytic converter having a substrate formed in accordance with the teachings of the present invention.

The following description of the preferred embodiment is merely exemplary in nature and is in no way intended to limit the invention or its application or uses.

Referring in particular to the FIG. 1, a catalytic converter to be installed in an exhaust system of a motor vehicle is generally illustrated by reference numeral 10. Although not shown in the drawings the catalytic converter 10 is typically installed in the under body of a vehicle and forms a part of the vehicle exhaust system. Alternatively, it may be installed in any other suitable place in the vehicle to typically convert the noxious emissions emitted from the engine.

The catalytic converter 10 comprises a housing or an outer shell 12. Although not shown in the drawings, typically one end of the housing 12 is connected a conduit for receiving exhaust gasses from the engine. The other end of the housing 12 is connected to a exhaust pipe that emits gases that have been converted by the catalytic converter 10. The housing 12 comprises an inner wall 14, an outer wall 15 and defines a hollow interior 16.

The catalytic converter 10, as shown has only one housing 12. Alternatively, it is possible to have a dual housing catalytic converter 10 having an inner housing and an outer housing. The housing 12 preferably include a central portion 20 and two end portions 22 and 24 connected on either side of the central portion 20. The catalytic converter 10 defines a central axis represented by reference numeral 26. The catalytic converter 10 also defines a vertical axis 25. The central portion 20 is preferably symmetrical around the central axis 26 and the vertical axis 25. Alternatively, the cross section of the central portion 20 can be round, ellipse or oval.

The catalytic converter 10 in accordance with the teachings of the present invention also includes a catalytic substrate 30 inserted into the hollow interior 16 of the housing 12. Preferably the substrate 30 is present in the central portion 20 of the housing 12. The substrate 30 used in the present invention is commercially available from Corning, Inc. and is a ceramic composite brick with the suitable catalyst coated on the ceramic brick.

Figure 2:
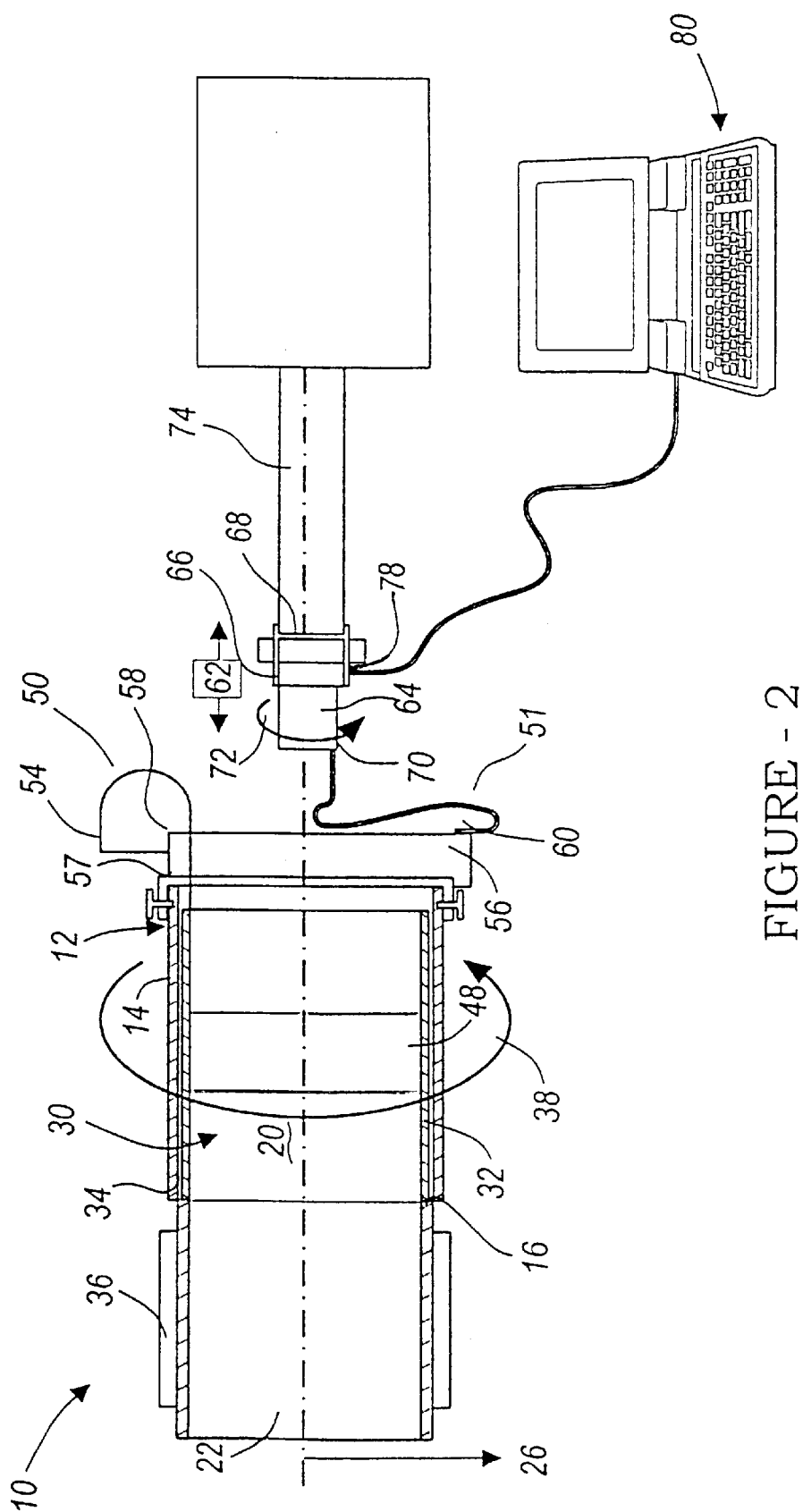
FIG. 2 is a cross sectional view of the catalytic converter having pressure-measuring device inserted inside the catalytic converter in accordance with the teachings of the present invention.

In order to protect the substrate 30 from environmental damage during use of the catalytic converter 10, a mat 32 (as shown in FIG. 2) is wrapped around the substrate 30. The mat 32 is made of a fiberglass. Preferably, the thickness of the mat 32 is around 10 mm thick. The mat 32 is preferably attached to the substrate 30 with the help of an adhesive such as tape.

Referring in particular to FIG. 2, the substrate 30 and the mat 32 are inserted inside the hollow interior 16 of the central portion 20 using well known techniques. Once the substrate 30 and the mat 32 are inserted inside the hollow interior 16, a gap 34 is defined between the mat 32 and the inner walls 14 of the housing 12. In order to reduce the gap 34 between the mat 32 and the inner wall 14, the catalytic converter 10 is subject to the spin forming process. In the alternate, the spinning process is used to form the housing of the catalytic converter 10 having the central portion 20, and the end portions 22 and 24. In order to form the catalytic converter 10, a tubular work piece is used and the substrate is inserted inside the tubular work piece. The tubular work piece is then subject to spin forming process to form the housing 12 having a central portion 20 and end portions 22 and 24.

Although not shown in the drawings, the spin forming process comprises the use of a spinning machine. As shown in FIG. 2 the catalytic converter 10 is mounted horizontally on a shaft (not shown) and is held in place with the help of a chuck 36. The catalytic converter 10 is capable of rotating around its central axis 26 in the direction of arrows shown by reference numeral 38.

As shown in FIG. 1, the spinning machine includes a roller 40. The roller 40 used in the present invention is well known in the art and is not explained in details. The roller 40 is placed perpendicular or at an angle to the central axis 26 and is in contact with the outer wall 15 of the catalytic converter 10 such that the roller 40 moves in a desired direction. Preferably, the roller 40 is mounted on actuators (not shown) that move the roller 40 in a direction transverse, shown by arrows 42, to the central axis 26 such that the roller 40 is moving towards the central axis 26. In this direction the rollers 40 will reduce the diameter of the outer wall 15 of the catalytic converter 10. In addition, the roller 32 is also capable of moving in a direction parallel shown by arrows 44 to the central axis 26 such that the roller 40 forms the desired shape of the housing 12.

Referring in particular to FIGS. 1 and 2 as the catalytic converter 10 is subject to the spinning process, a substantial pressure is exerted on the substrate 30. In order to measure the pressure exerted on the substrate 30 during the spinning process, a pressure-measuring device is provided. The pressure-measuring device is placed in contact with the substrate 30 such that pressure on the substrate 30 is measured as the catalytic converter 10 is subject to the spin forming process.

The pressure-measuring device comprises a pressure sensor 48 and at least one lead wire 50 connected to the pressure sensor 48. The pressure sensor 48 is in contact with the substrate 30. The pressure sensor 48 is capable of outputting a pressure signal indicative of the pressure exerted on the substrate 30. Preferably, a film type pressure sensor is used and is commercially available from Tekscan, Inc. The lead wire 50 carries the pressure signal to a signal processing electronics board 56. Preferably, the signal processing electronics board 56 is an analog digital board (A/D Board). The signal processing electronics board 56 acts as a signal conditioner to the pressure signal from the pressure sensor. In particular, signal processing electronics board converts analog signals to digital signals. The signal processing electronics board 56 preferably comprises an input section 58 and an output section 60. The signal processing electronics board 56 is attached to the housing 12 with the help of clamps 57 and is capable of rotating with the catalytic converter 10.

In order to measure the pressure exerted on the substrate 30 during the spin forming process, a cable 51 from the output section 60 of the signal processing electronics board 56 is connected to a slip ring device 62. The cable 51 is capable of rotating with the catalytic converter 10. The slip ring device 62 comprises a slip ring rotor 64, a slip ring stator 66 and a slip ring adapter 68. The slip ring rotor 64 comprises an input socket 70, wherein the cable 51 from the output section 60 of the signal processing electronics board 56 is connected to the input socket 70 of the slip ring rotor 64. The slip ring rotor 64 receives the pressure signal from the pressure sensor 48. The slip ring rotor 64 is capable of rotating around an axis in the direction shown by arrow 72 with the catalytic converter 10. Therefore, as the catalytic converter 10 is rotating around axis 26, the slip ring rotor 64 is also rotating with the catalytic converter 10. The slip ring rotor 64 is mechanically and electrically connected to the slip ring stator 66. The slip ring stator 66 is preferably stationary and is connected to a stationary object 74 such as a tailstock mandrill with the help of a slip ring adaptor 68.

The slip ring stator 66 comprises an output socket 78 corresponding to the input socket 70. The output socket 78 is connected to a processor 80 such as a computer. The processor 80 measures the pressure signal from the slip ring rotor 64 and thereby measuring the amount of pressure exerted on the substrate 30. It is preferred that the pressure exerted on the substrate 30 does not exceed 100 psi. If the processor 80 measures pressure on the substrate 30 to exceed the preferred limit, the processor 80 can change spin forming parameters such as the speed of rotation of the catalytic converter 10, the speed at which the rollers 40 move perpendicular or parallel to the central axis 26 or the distance traveled by the roller 40 towards the central axis 26. By controlling the spin forming parameters the pressure exerted on the substrate 30 can be controlled and will help prevent premature breaking of the substrate 30.

As any person skilled in the art will recognize from the previous description and from the figures and claims, modifications and changes can be made to the preferred embodiment of the invention without departing from the scope of the invention as defined in the following claims.

What is claimed is:

1. A method for forming a catalytic converter rotating around a central axis having a housing and a substrate inserted inside the housing for an automobile, the method comprising:

forming the housing using a roller to exert pressure on the housing;

attaching a pressure sensor to the substrate;

inserting the substrate inside the housing;

measuring the pressure exerted on the substrate by the roller, wherein the pressure sensor measures the pressure;

outputting a pressure signal from the pressure sensor indicative of the pressure exerted on the substrate;

connecting a slip ring device to the pressure sensor, wherein the slip ring device receives the pressure signal from the pressures sensor; and processing the pressure signal from the slip ring device by using a processor connected to the slip ring device.

2. The method of claim 1, further comprising moving the roller in a transverse direction with respect to the central axis to reduce the diameter of the housing.

3. The method of claim 1, further comprising moving the roller in a parallel direction with respect to the central axis to form a pre-determined shape of the housing.

4. The method of claim 1, wherein the slip ring device further comprising a rotating part and a stationary part.

5. The method of claim 4, further comprising rotating the rotating part of the slip ring device with the catalytic converter.

6. The method of claim 4, further comprising:

connecting the processor to the stationary part of the slip ring device; and transferring the pressure signal from the pressure sensor to the stationary part through the rotating part of the slip ring device.

7. The method of claim 1, further comprising connecting a signal processing electronics board to the pressure sensor and the slip ring device.

8. The method of claim 7, further comprising rotating a signal processing electronics board with the catalytic converter.

9. The method of claim 1, further comprising conditioning the pressure signal from the pressure sensor by a signal processing electronics board.

10. The method of claim 1, further comprising transferring signals from the pressure sensor to the processor through a signal processing electronics board.

11. A method for forming a catalytic converter rotating around a central axis having a housing and a substrate inserted inside the housing for an automobile, the method comprising:

forming the housing using a roller to exert pressure on the housing;

attaching a pressure sensor to the substrate;

inserting the substrate inside the housing;

measuring the pressure exerted on the substrate by the roller, wherein the pressure sensor measures the pressure;

outputting a pressure signal from the pressure sensor indicative of the pressure exerted on the substrate;

connecting a slip ring device to the pressure sensor, wherein the slip ring device receives the pressure signal from the pressures sensor and the slip ring device includes a rotating part and a stationary part; and processing the pressure signal from the slip ring device by using a processor connected to the slip ring device.

12. The method of claim 11, further comprising rotating the rotating part of the slip ring device with the catalytic converter.

13. The method of claim 11, further comprising connecting the processor to the stationary part of the slip ring device.

14. The method of claim 11, further comprising connecting a signal processing electronics board to the pressure sensor and the slip ring device.

15. The method of claim 11, further comprising conditioning the pressure signal from the pressure sensor by a signal processing electronics board.

16. The method of claim 11, further comprising transferring signals from the pressure sensor to the processor through a signal processing electronics board.

17. The method of claim 11, further comprising rotating a signal processing electronics board with the catalytic converter.

* * * * *

UNITED STATES PATENT AND TRADEMARK OFFICE
CERTIFICATE OF CORRECTION

PATENT NO. : 6,732,429 B2
DATED : May 11, 2004
INVENTOR(S) : Li Houliang et al.

It is certified that error appears in the above-identified patent and that said Letters Patent is hereby corrected as shown below:

Title page,
Item [75], Inventors, delete "Monroe, OH" and substitute -- Monroe, MI -- in its place.
Item [56], References Cited, U.S. PATENT DOCUMENTS, delete "Dryer" and substitute -- Shiets -- in its place.

Column 4,
Line 49, after "device; and" start a new paragraph with the words "and transferring".

Signed and Sealed this

Thirty-first Day of August, 2004

JON W. DUDAS
*Director of the United States Patent and Trademark Office*